United States Patent
Inoue

(10) Patent No.: US 8,913,265 B2
(45) Date of Patent: Dec. 16, 2014

(54) IMAGE FORMING APPARATUS, METHOD FOR CONTROLLING THE IMAGE FORMING APPARATUS, AND PROGRAM

(71) Applicant: Canon Kabushiki Kaisha, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/894,162

(22) Filed: May 14, 2013

(65) Prior Publication Data

US 2013/0250337 A1 Sep. 26, 2013

Related U.S. Application Data

(63) Continuation of application No. PCT/JP2012/079363, filed on Nov. 13, 2012.

(30) Foreign Application Priority Data

Nov. 15, 2011 (JP) .................................. 2011-249897

(51) Int. Cl.
*H04N 1/00* (2006.01)
*G06F 3/12* (2006.01)
*G06F 1/32* (2006.01)

(52) U.S. Cl.
CPC .......... *H04N 1/00896* (2013.01); *G06F 3/1236* (2013.01); *G06F 3/1203* (2013.01); *G06F 3/1285* (2013.01); *G06F 1/32* (2013.01); *G06F 3/1221* (2013.01); *G06F 3/1229* (2013.01)
USPC ......... 358/1.13; 358/1.14; 358/1.15; 713/323

(58) Field of Classification Search
None
See application file for complete search history.

(56) References Cited

U.S. PATENT DOCUMENTS

| | | | |
|---|---|---|---|
| 2006/0200704 A1* | 9/2006 | Takahashi et al. | 714/38 |
| 2007/0211725 A1* | 9/2007 | Kawata et al. | 370/392 |
| 2007/0247467 A1* | 10/2007 | Kaneda | 358/1.14 |
| 2008/0034240 A1* | 2/2008 | Park | 713/323 |
| 2009/0083427 A1* | 3/2009 | Kuroishi et al. | 709/227 |
| 2009/0125739 A1* | 5/2009 | Satoh | 713/322 |
| 2009/0244588 A1* | 10/2009 | Kuroishi et al. | 358/1.14 |
| 2010/0128305 A1* | 5/2010 | Kawata et al. | 358/1.15 |
| 2010/0268973 A1* | 10/2010 | Park | 713/323 |
| 2011/0138201 A1* | 6/2011 | Park | 713/310 |
| 2011/0249285 A1* | 10/2011 | Kobayashi et al. | 358/1.13 |
| 2013/0250338 A1* | 9/2013 | Park | 358/1.13 |
| 2013/0262900 A1* | 10/2013 | Paljug | 713/323 |

FOREIGN PATENT DOCUMENTS

| | | | |
|---|---|---|---|
| JP | 2001-100968 A | 4/2001 | |
| JP | 2006-237734 A | 9/2006 | |
| JP | 2006-259906 A | 9/2006 | |
| JP | 2010-000625 A | 1/2010 | |
| JP | 2010-280093 A | 12/2010 | |
| JP | 2011-138424 A | 7/2011 | |
| JP | 2011-205580 A | 10/2011 | |

* cited by examiner

*Primary Examiner* — Kimberly A Williams

(74) *Attorney, Agent, or Firm* — Canon USA, Inc. IP Division

(57) ABSTRACT

The present invention relates to an image forming apparatus including transmitting and receiving means for transmitting and receiving data to and from an external apparatus via a network.

12 Claims, 7 Drawing Sheets

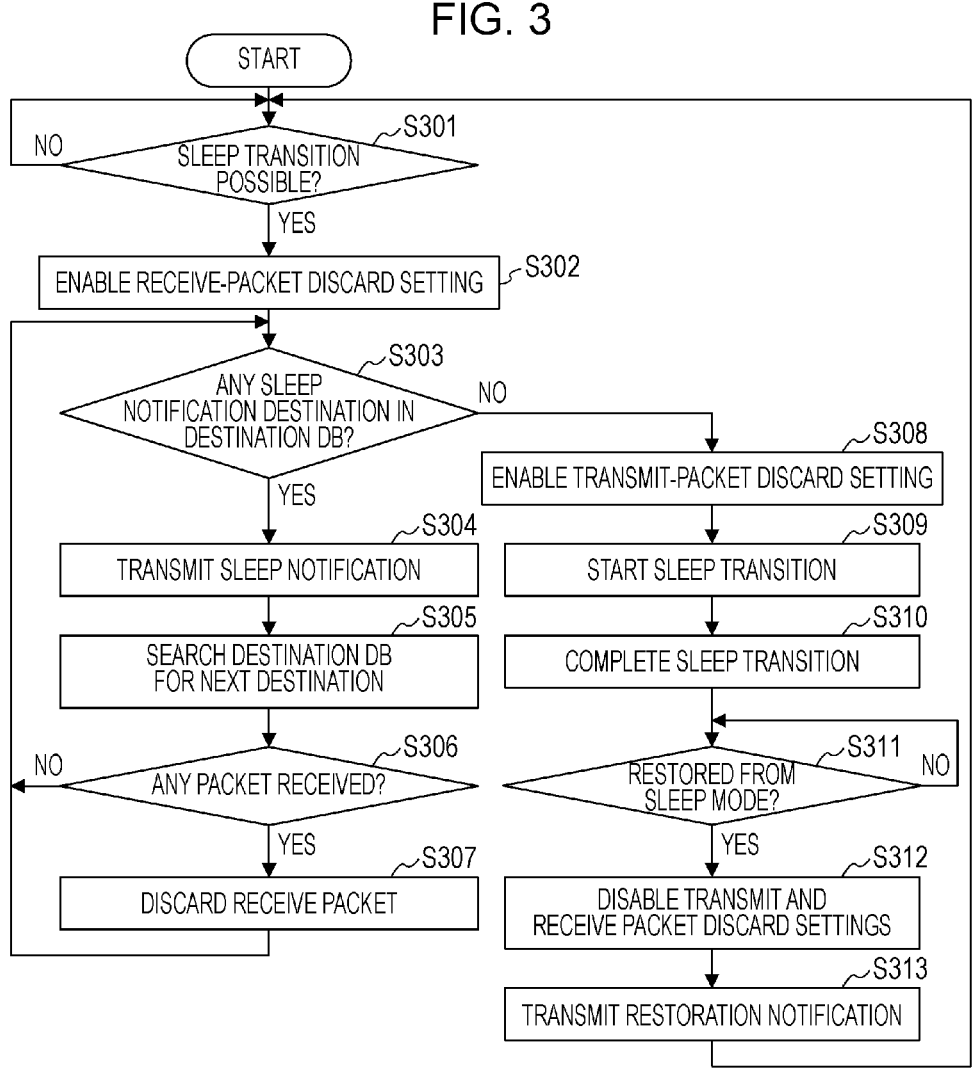

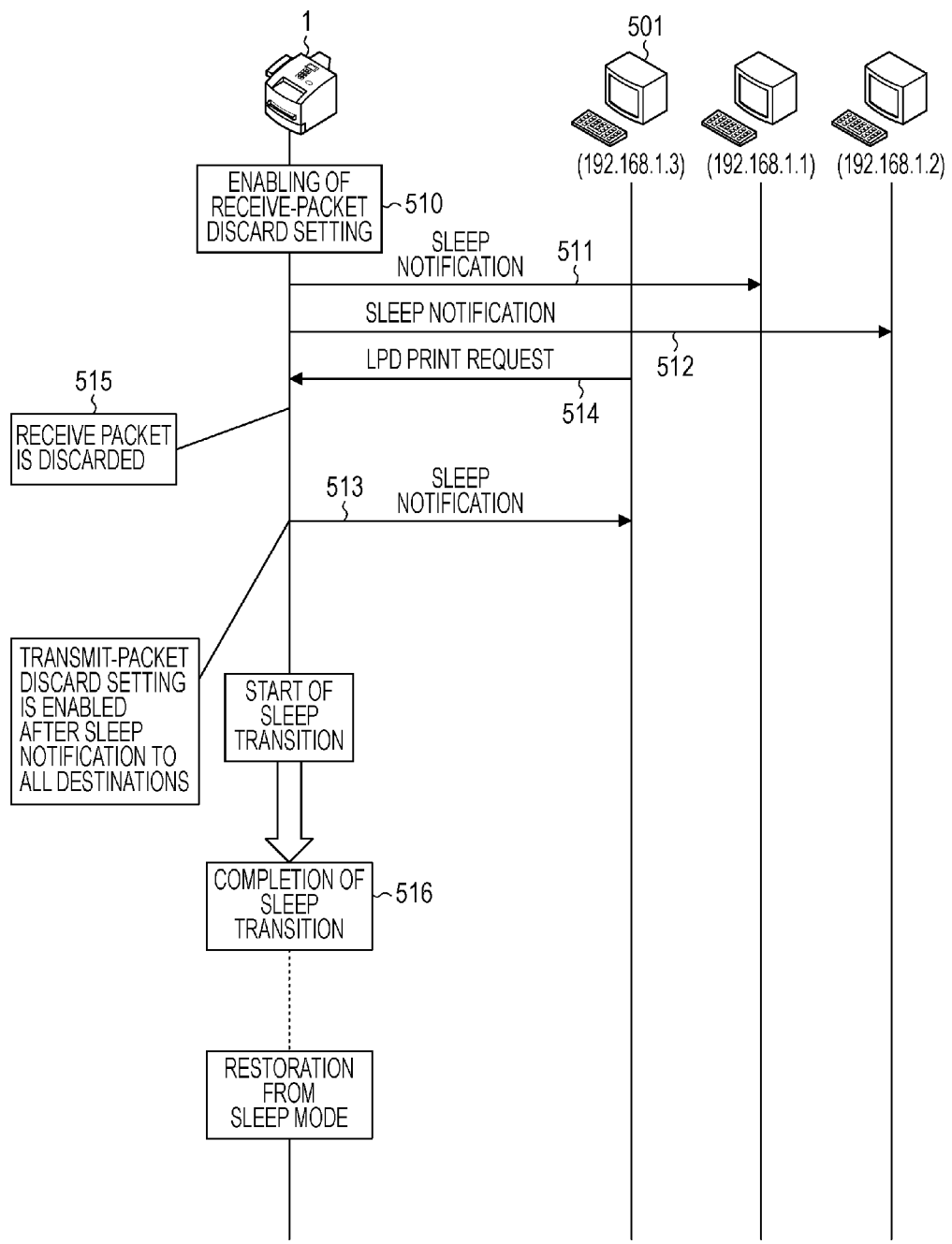

| No | DESTINATION IP ADDRESS | PROTOCOL | TYPE | PATTERN |
|---|---|---|---|---|
| 1 | 239.255.255.253 | SLP | UDP | MULTICAST |
| 2 | 192.168.1.1 | SLP | TCP | UNICAST |
| 3 | 192.168.1.2 | SLP | UDP | UNICAST |
| 4 | 192.168.1.3 | SLP | TCP | UNICAST |

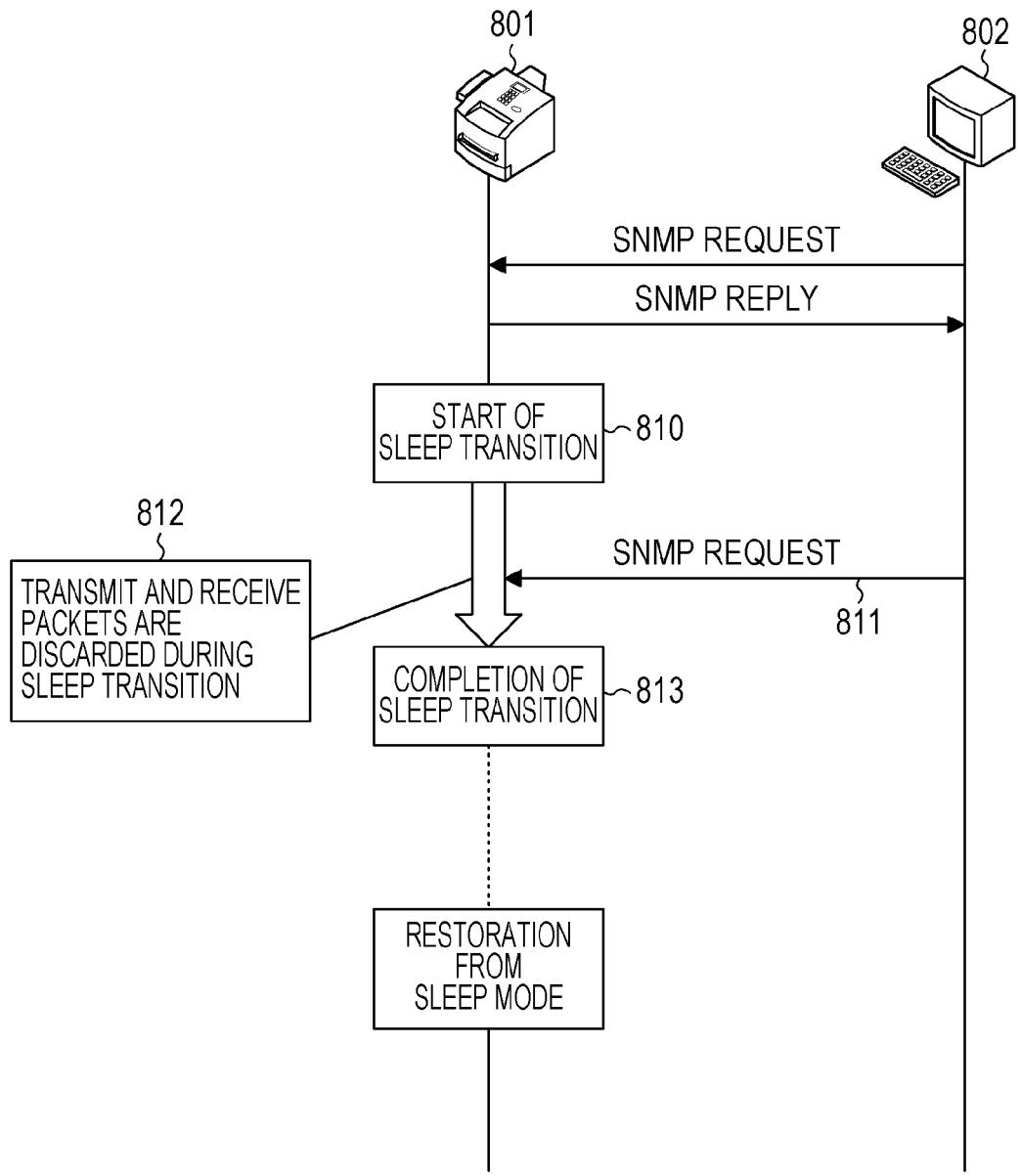

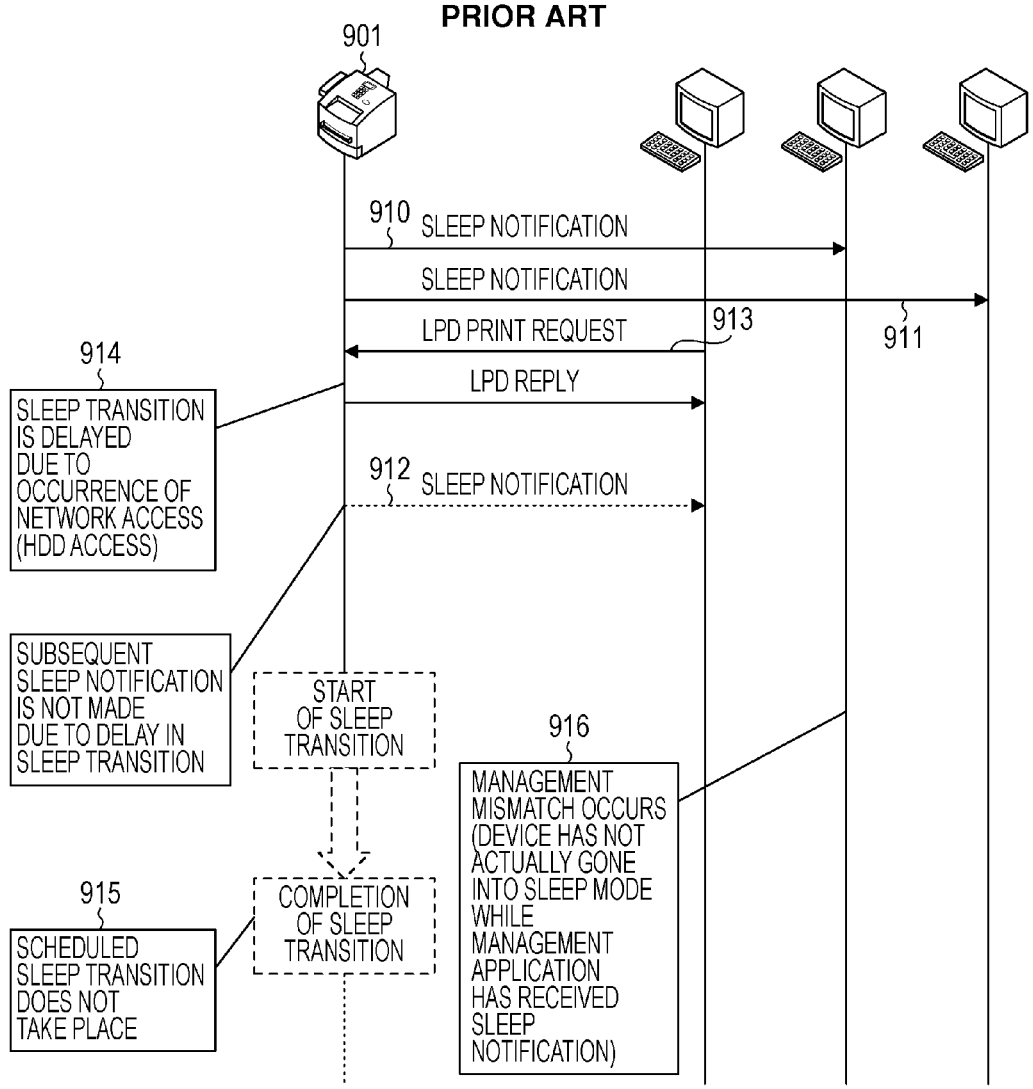

IMAGE FORMING APPARATUS, METHOD FOR CONTROLLING THE IMAGE FORMING APPARATUS, AND PROGRAM

CROSS-REFERENCE TO RELATED APPLICATIONS

This application is a Continuation of International Patent Application No. PCT/JP2012/079363, filed Nov. 13, 2012, which claims the benefit of Japanese Patent Application No. 2011-249897, filed Nov. 15, 2011, both of which are hereby incorporated by reference herein in their entirety.

TECHNICAL FIELD

The present invention relates to packet control techniques for state transition in an image forming apparatus.

BACKGROUND ART

In recent years, a power saving function has advanced to reduce power consumption of devices, such as image forming apparatuses. With the power saving function, after a certain period of idleness, a device goes into "sleep mode" in which power is supplied to only part of the device, so that the device operates with low power consumption.

With the spread of network technology, there will be more situations where devices and hosts regularly exchange data via networks. A technique has been provided which allows data processing via a network even when a device is in "sleep mode". In this technique, the device is equipped with multiple CPUs, a main CPU and a sub-CPU. The main CPU carries out processing in non-sleep mode, and the sub-CPU with low power consumption carries out the processing in place of the main CPU in sleep mode (see PTL 1).

In such a system, the sub-CPU has the function of determining whether to respond to or discard a received network packet on behalf of the main CPU, or restore the main CPU from sleep mode, and carrying out the processing as determined.

As devices have become more multifunctional in recent years, a main CPU for controlling such a device has been provided with more drivers. Therefore, for transition to sleep mode, it is necessary to perform stop processing for such drives. If the device is an image forming apparatus, the transition also involves processing for stopping an engine, such as a fixing unit.

It takes several seconds to perform such processing. That is, from the time when the device determines to go into sleep mode until the time when the device actually goes into sleep mode, it takes several seconds for the sleep preparation.

If the main CPU receives a network packet from an external host during the sleep preparation, the device may go into sleep mode during processing in a protocol stack or application, depending on the timing (see FIG. 7).

As illustrated in FIG. 7, during transition to sleep mode (710), even if a request packet (SNMP Request) 711 that requests processing is received from an external host 702, an image forming apparatus 701 goes into sleep mode (712) during processing in the protocol stack or application. Then, upon restoration from sleep mode (713), the image forming apparatus 701 advances the processing of the request packet 711 and transmits a reply packet (714) to the external host 702.

However, even if the image forming apparatus 701 advances the packet processing and transmits the reply packet upon restoration from sleep mode, the reply packet may be regarded as an invalid packet due to the lapse of a certain period of time, or may be regarded as an attack packet due to the arrival of the reply packet at an unexpected time for the external host 702.

Therefore, typically, packets to be transmitted and received during sleep preparation are discarded by the main CPU at the driver or protocol stack level (see FIG. 8).

As illustrated in FIG. 8, during transition to sleep mode (810), even if a request packet (SNMP Request) 811 that requests processing is received from an external host 802, an image forming apparatus 801 discards the packet (812) and goes into sleep mode (813).

CITATION LIST

Patent Literature
PTL 1 Japanese Patent Laid-Open No. 2006-259906

However, in conventional control of discarding transmit and receive packets during transition to sleep mode, a management application for managing the device is unable to accurately manage the device (see FIG. 9).

Device management applications that have been available in recent years typically have the function of keeping track of the status of sleep mode of the device. For example, a management application manages the time when the device has gone into sleep mode and the time when the device has been restored from sleep mode. Thus, the management application calculates the power consumption of the device and presents the calculated power consumption to the user.

Therefore, the device has the function of transmitting a notification packet to the management application immediately before going into sleep mode and immediately after being restored from sleep mode. As described above, the device is configured to discard transmit and receive packets during transition to sleep mode. Therefore, a notification packet indicating transition to sleep mode is actually transmitted before transition to sleep mode.

For example, assume that the device has two types of sleep-mode notification functions. One is a protocol for transmitting a sleep-mode notification by multicast, and the other is a protocol for transmitting a sleep-mode notification to a pre-registered host using unicast TCP or UDP.

After a transition to sleep mode is tentatively determined, as illustrated in FIG. 9, a device (901) first transmits a sleep notification (910) to a management application using a multicast packet. Upon receipt of the sleep notification packet, the management application changes the state of the device from "normal mode" to "sleep mode".

Next, the device (901) transmits the sleep notification to each of pre-registered hosts by unicast (911 and 912). If a network access (913) from an external host to the device occurs during this operation, the device (901) delays the transition to sleep mode (914). For example, if print processing is executed from a host, the device does not go into sleep mode until the printing is completed and a hard-disk protection period for protecting a hard disk of the device elapses (915).

This results in a management mismatch (916) in which, although the management application for the device has already received the sleep notification (910), the device has not yet actually gone into sleep mode.

The present invention has been made to solve the problems described above. An object of the present invention is to provide a mechanism for preventing transmission of an invalid network packet from a device restored from sleep mode, and for allowing a management application that manages the device to accurately manage the state of the device without any mismatch.

SUMMARY OF INVENTION

The present invention provides an image forming apparatus that includes transmitting and receiving means for transmitting and receiving data to and from an external apparatus via a network. The image forming apparatus includes sleep means for causing the image forming apparatus to go into a sleep mode; storage means for storing at least one destination to be notified of transition to the sleep mode; receive-data discard setting means for enabling, for transition to the sleep mode, receive-filter control processing for causing the transmitting and receiving means to discard data received by the image forming apparatus; notifying means for transmitting, after the receive-filter control processing is enabled, a sleep notification via the transmitting and receiving means to a destination registered in the storage means, the sleep notification indicating that the image forming apparatus is to go into the sleep mode; and transmit-data discard setting means for enabling, after completion of the sleep notification, transmit-filter control processing for causing the transmitting and receiving means to discard data to be transmitted from the image forming apparatus. After the transmit-filter control processing is enabled, the sleep means causes the image forming apparatus to go into the sleep mode.

Further features of the present invention will become apparent from the following description of exemplary embodiments with reference to the attached drawings.

BRIEF DESCRIPTION OF DRAWINGS

FIG. 3 is a flowchart illustrating an operation of image forming apparatus software 2 illustrated in FIG. 2.

FIG. 4 illustrates a sleep-notification destination DB 208 according to a first embodiment.

FIG. 5 illustrates a network sequence in the first embodiment.

FIG. 8 illustrates another network sequence of related art.

FIG. 9 illustrates another network sequence of related art.

DESCRIPTION OF EMBODIMENTS

The best mode for carrying out the present invention will now be described with reference to the drawings. Hereinafter, an image forming apparatus will be described as an exemplary device of the present invention.

First Embodiment

A first embodiment describes the case where an image forming apparatus to which the present invention is applied transmits a sleep notification using UDP.

Figure 1:
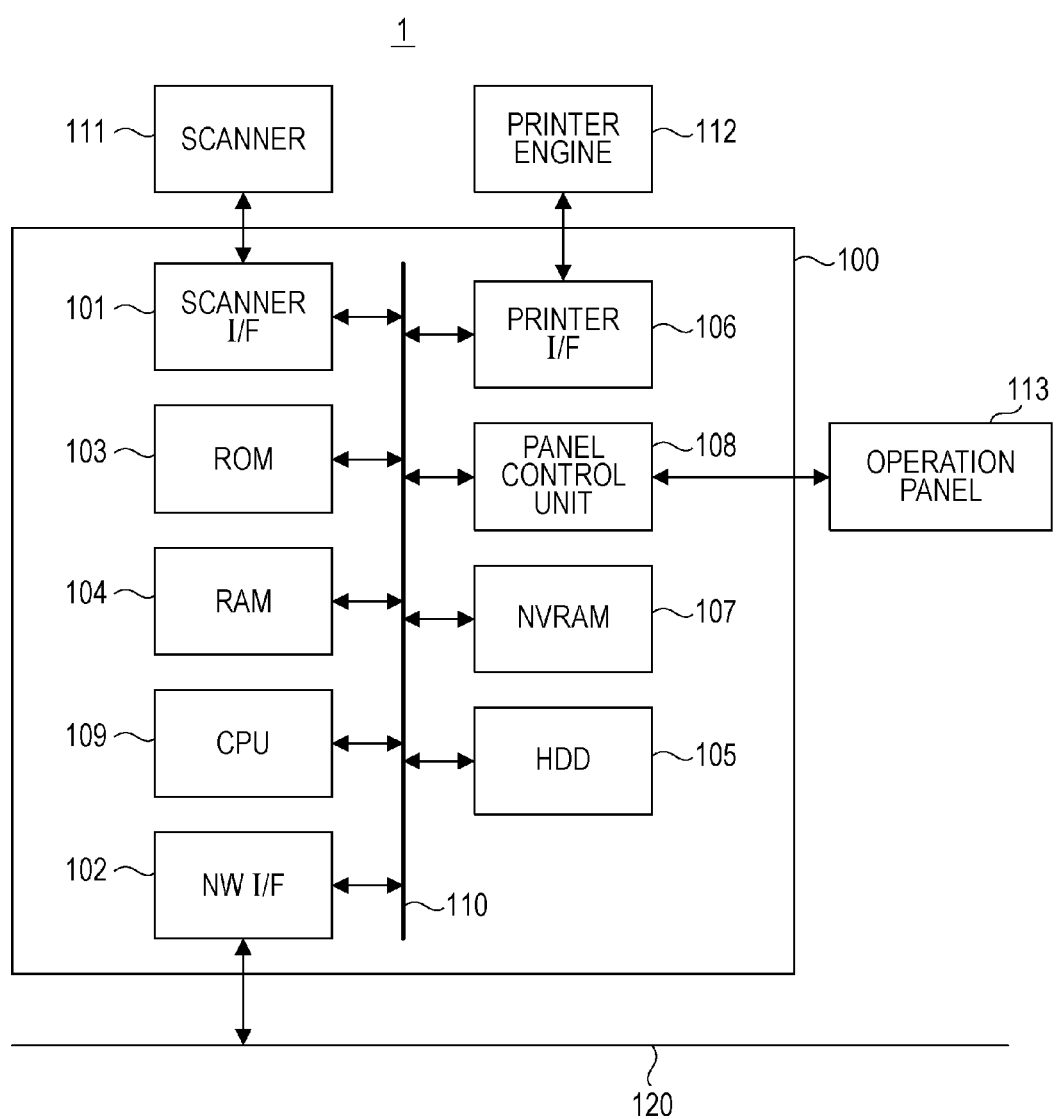
FIG. 1 is a block diagram illustrating a hardware configuration of an image forming apparatus representing an embodiment of the present invention.

FIG. 1 is a block diagram illustrating a hardware configuration of an image forming apparatus representing an embodiment of the present invention.

As illustrated in FIG. 1, an image forming apparatus 1 of the present embodiment includes a controller 100, a scanner 111, a printer engine 112, and an operation panel 113.

A program ROM in a ROM 103 stores a control program that can be executed by a CPU 109. A data ROM in the ROM 103 stores information used by the image forming apparatus 1.

In accordance with a control program stored in a computer-readable manner in the program ROM in the ROM 103, the CPU 109 performs general control over access to and from various devices connected to a system bus 110.

The CPU 109 outputs an image signal (output information) to a printer engine 112 connected thereto via a printer I/F 106. Also, the CPU 109 controls an image signal input from a scanner 111 connected thereto via a scanner I/F 101.

A RAM 104 mainly serves as a main memory and a work area for the CPU 109. The RAM 104 is configured such that its memory capacity can be expanded by an optional RAM connected to an extension port (not shown).

A hard disk (HDD) 105 is used as a job storage area for storing font data, emulation program, and form data, for spooling a print job, and for controlling the spooled job from outside. The HDD 105 is also used as a BOX data storage area for holding image data read from the scanner 111 and image data of a print job as BOX data, which is referenced and printed from a network.

A nonvolatile memory (NVRAM) 107 stores, via a panel control unit 108, various setting information specified on the operation panel 113. A network interface (NW I/F) 102 performs data communication with an external network 120 via a network cable.

Figure 2:
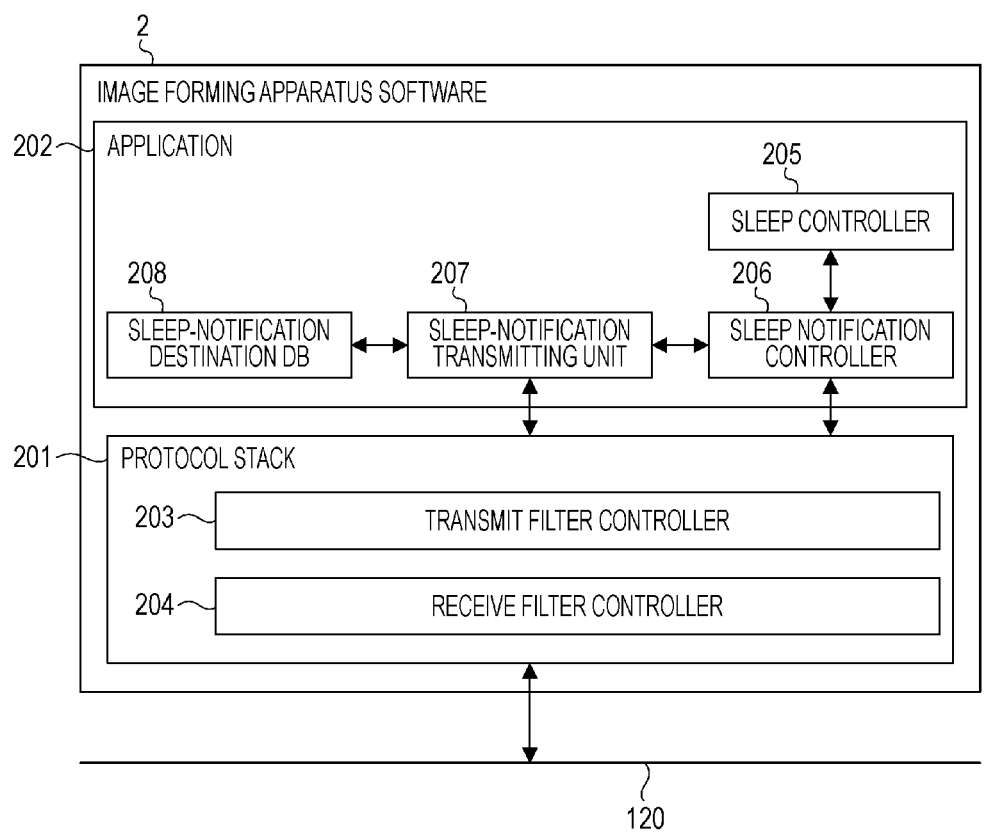
FIG. 2 is a block diagram illustrating a software configuration of the image forming apparatus 1 illustrated in FIG. 1.

FIG. 2 is a block diagram illustrating a software configuration of the image forming apparatus 1 illustrated in FIG. 1.

Image forming apparatus software 2 illustrated in FIG. 2 is a function realized when the CPU 109 of the image forming apparatus 1 reads and executes a program stored in a computer-readable manner in the ROM 103.

As illustrated in FIG. 2, the configuration of the image forming apparatus software 2 is mainly divided into a kernel section running in a kernel space, and an application section (application 202) running in a user space. A network protocol stack (protocol stack 201) for controlling network transmission and reception is incorporated in the kernel section.

First, the application 202 will be described.

The application 202 includes a sleep controller 205, a sleep notification controller 206, a sleep-notification transmitting unit 207, and a sleep-notification destination DB 208.

The sleep controller 205 controls whether to make a transition from "normal mode" in which power is supplied to all units of the image forming apparatus to "sleep mode" in which power is supplied to only some units of the image forming apparatus. If it is determined that sleep mode is to be entered, the sleep controller 205 notifies the sleep notification controller 206 of information about determination of sleep transition.

Upon receipt of the information about determination of sleep transition, the sleep notification controller 206 transmits a sleep notification packet via the sleep-notification transmitting unit 207 to an external host. Either a general-purpose protocol, such as a service location protocol (SLP), or a specifically-defined protocol may be used as the format of the sleep notification packet. The destination to which the sleep notification is to be transmitted is determined on the basis of a destination IP address stored in the sleep-notification destination DB 208.

Similarly, when the image forming apparatus 1 is restored from "sleep mode" to "normal mode", the sleep controller 205 notifies the sleep notification controller 206 of restoration information indicating that the image forming apparatus 1 has been restored from sleep mode.

Upon receipt of the restoration information, the sleep notification controller 206 transmits a restoration notification packet via the sleep-notification transmitting unit 207 to the external host.

Next, the protocol stack 201 will be described.

The protocol stack 201 interprets an IP header and a TCP header and performs packet control for data communication between the application 202 and an external host. The protocol stack 201 includes a receive filter controller 204 and a transmit filter controller 203.

For access from a specific address or access to a specific port number, the receive filter controller 204 either discards a receive packet or gives permission (receive-filter control processing function). Similarly, for access to a specific address or transmission to a specific port number, the transmit filter controller 203 either discards a transmit packet or gives permission (transmit-filter control processing function).

Although filter control is performed at a driver level (physical layer) in the present embodiment, the filter control may be performed at any of the following layers: a physical layer, an IP layer, a TCP/UDP layer, and an application layer.

An operation of the image forming apparatus software 2 will now be described with reference to FIG. 3.

FIG. 3 is a flowchart illustrating an operation of the image forming apparatus software 2 illustrated in FIG. 2. The operation of the present flowchart is realized when the CPU 109 of the image forming apparatus 1 reads and executes a program stored in a computer-readable manner in the ROM 103.

In step S301, the sleep controller 205 determines whether the image forming apparatus 1 can go into sleep mode. For example, this determination is made on the basis of whether a hard-disk protection period has elapsed since the last access to the hard disk 105.

If it is determined in step S301 that transition to sleep mode is not possible (NO in step S301), the sleep controller 205 returns the process to step S301.

On the other hand, if it is determined in step S301 that transition to sleep mode is possible (YES in step S301), the sleep controller 205 notifies the sleep notification controller 206 that transition to sleep mode is possible.

Upon receipt of the notification indicating that transition to sleep mode is possible, the sleep notification controller 206 activates the receive filter controller 204 in the protocol stack 201 in step 5302 to enable the setting (receive-packet discard setting) for discarding all receive packets (receive-filter control processing).

In step S303, the sleep notification controller 206 refers to the sleep-notification destination DB 208 to determine whether there is any destination to which the sleep notification is to be transmitted. For example, the sleep-notification destination DB 208 is in the form of a list, such as that of FIG. 4.

FIG. 4 illustrates an example of the sleep-notification destination DB 208 according to the first embodiment.

As illustrated in FIG. 4, notification destination data (destinations) managed by the sleep-notification destination DB 208 contains destination IP address, protocol type (e.g., SLP), transport type (e.g., UDP), and pattern (e.g., multicast or unicast).

For example, row No. 1 in FIG. 4 stores a destination for transmitting a sleep notification by SLP multicast. Row No. 2 stores a destination for transmitting a sleep notification to 192.168.1.1 by SLP unicast using UDP. Row No. 3 stores a destination for transmitting a sleep notification to 192.168.1.2 by SLP unicast using UDP. Row No. 4 stores a destination for transmitting a sleep notification to 192.168.1.3 by SLP unicast using UDP. The notification destination data managed by the sleep-notification destination DB 208 may contain attributes, such as port number and address family (AF_INET, AF_INET6, etc.).

The sleep-notification destination DB 208 stores and manages static addresses and dynamic addresses. The static addresses are stored, for example, in the ROM 103 in advance before shipment from the factory. The dynamic addresses are registered by the user.

The description will now return to FIG. 3.

If it is determined in step S303 that there is any destination to which the sleep notification is to be transmitted (YES in step S303), the sleep-notification transmitting unit 207 advances the process to step S304.

In step S304, the sleep-notification transmitting unit 207 reads a destination in the sleep-notification destination DB 208 and transmits the sleep notification to the destination.

Upon completion of the transmission, the sleep-notification transmitting unit 207 searches the sleep-notification destination DB 208 for the next destination in step S305.

If the receive filter controller 204 for which the receive-packet discard setting has been enabled in step S302 determines that a network packet has been received from an external host during steps S303 to S305 (YES in step S306), the receive filter controller 204 discards the received packet (in step S307). With this operation, the device can prevent the sleep transition from being delayed by reception via the network.

Next, the sleep-notification transmitting unit 207 returns the process to step S303. In step S303, in accordance with the result of the search for the next destination in step S305, the sleep-notification transmitting unit 207 determines whether there is any destination to which the sleep notification is to be subsequently transmitted. As long as there is a destination for transmission (i.e., while "YES" is selected in step S303), the sleep-notification transmitting unit 207 repeats the operation of steps S304 and S305.

In the example illustrated in FIG. 4, a sleep notification is transmitted first by SLP multicast. Next, the sleep notification is transmitted to 192.168.1.1 by SLP unicast using UDP. Next, the sleep notification is transmitted to 192.168.1.2. Next, the sleep notification is transmitted to 192.168.1.3. Thus, the sleep notification is received on the management application side, which starts the management on the basis of the recognition that the image forming apparatus 1 is in sleep mode.

If it is determined in step S303 that there is no destination to which the sleep notification is to be subsequently transmitted (NO in step S303), the sleep-notification transmitting unit 207 advances the process to step S308.

In step S308, the sleep notification controller 206 activates the transmit filter controller 203 in the protocol stack 201 to enable the setting (transmit-packet discard setting) for discarding all transmit packets (transmit-filter control processing). Additionally, the sleep notification controller 206 notifies the sleep controller 205 of the completion of sleep notification and filter control.

Upon receipt of the notification of completion of sleep notification and filter control from the sleep notification controller 206, the sleep controller 205 starts sleep transition in step S309. Upon completion of the transition, sleep mode is entered (in step S310).

If the image forming apparatus 1 is restored from sleep mode (YES in step S311), the sleep controller 205 notifies the sleep notification controller 206 that the image forming apparatus 1 has been restored from sleep mode.

Upon receipt of the notification of restoration from sleep mode, the sleep notification controller 206 disables, in step S312, the receive-packet discard setting enabled for the receive filter controller 204 in step S302 and the transmit-packet discard setting enabled for the transmit filter controller 203 in step S308.

In step S313, the sleep notification controller 206 transmits a restoration notification, via the sleep-notification transmitting unit 207, to all destinations stored in the sleep-notification destination DB 208. The restoration notification indicates that the image forming apparatus 1 has been restored from sleep mode. In the example illustrated in FIG. 4, the restoration notification is transmitted first by SLP multicast. Next, the restoration notification is transmitted to 192.168.1.1 by SLP unicast using UDP. Next, the restoration notification is transmitted to 192.168.1.2. Next, the restoration notification is transmitted to 192.168.1.3. Thus, the restoration notification is received on the management application side, which starts the management on the basis of the recognition that the image forming apparatus 1 is in normal mode.

A specific example will now be described with reference to FIG. 5.

FIG. 5 illustrates a network sequence in the first embodiment.

By executing the process illustrated in FIG. 3, the receive-packet discard setting is made effective (510) during transmission of the sleep notification (511 to 513) as illustrated in FIG. 5. Therefore, even if an LDP request packet (LDP Print Request) 514 that requests printing is received during this period from an external host 501, the image forming apparatus 1 discards the receive packet without accepting the print request (515).

Thus, since the image forming apparatus 1 can always go into sleep mode when it transmits the sleep notification (516), it is possible to prevent a mismatch between the notification to the management application and the actual state of the image forming apparatus 1.

It is also possible to prevent a mismatch in which, although the sleep notification has been received on the management application side, the image forming apparatus 1 has not yet gone into sleep mode.

Although FIG. 5 illustrates an example in which a print request is received from an external host, the present invention is applicable regardless of the protocol.

The amount of time by which sleep transition is to be delayed by protocol processing varies depending on the device configuration. For example, in the case of reception using a protocol for access to the HDD, the sleep transition needs to be delayed by at least the hard-disk protection period. In the case of a device-information acquisition protocol, such as SNMP or SLP, since there is a possibility of repeated accesses, the sleep transition is typically delayed by at least several tens of seconds.

Note that the device is not limited to the image forming apparatus. The present invention is applicable to any network device capable of going into sleep mode.

As described above, according to the present embodiment, it is possible to create a network environment where transmission of invalid network packets from a device that goes into sleep mode can be prevented and a management application that manages the device can accurately manage the state of the device without any mismatch.

The sleep notification controller 206 may be configured such that, immediately before the image forming apparatus 1 goes into sleep mode, the receive-packet discard setting enabled for the receive filter controller 204 in step S302 and the transmit-packet discard setting enabled for the transmit filter controller 203 in step S308 are disabled. In the case of this configuration, when the image forming apparatus 1 is restored from sleep mode, the sleep notification controller 206 skips the disabling of the transmit and receive packet discard settings in step S312 and transmits a restoration notification in step S313.

Second Embodiment

A second embodiment describes the case where the image forming apparatus 1 to which the present invention is applied transmits a sleep notification using TCP.

Figures 6, 7:
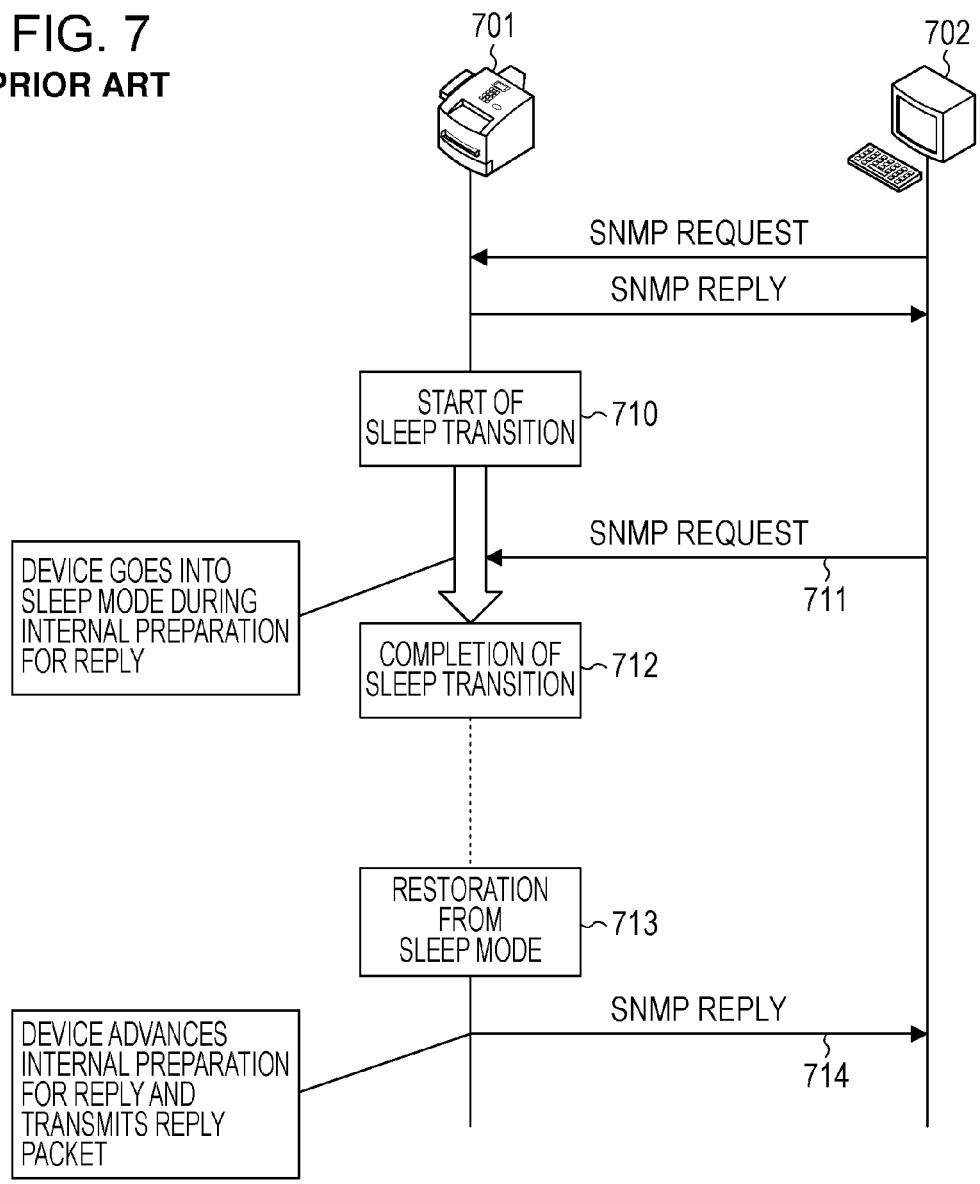
FIG. 6 illustrates a sleep-notification destination DB 208 according to a second embodiment.
FIG. 7 illustrates a network sequence of related art.

FIG. 6 illustrates an example of the sleep-notification destination DB 208 according to the second embodiment.

In the example illustrated in FIG. 6, the image forming apparatus 1 first transmits a sleep notification by SLP multicast. Next, the image forming apparatus 1 transmits the sleep notification to 192.168.1.1 by SLP unicast using TCP. Next, the image forming apparatus 1 transmits the sleep notification to 192.168.1.2 by SLP unicast using UDP. Next, the image forming apparatus 1 transmits the sleep notification to 192.168.1.3 by SLP unicast using TCP.

That is, when destinations are registered in the sleep-notification destination DB 208 as illustrated in FIG. 6, the image forming apparatus 1 needs to transmit a sleep notification to 192.168.1.1 and 192.168.1.3 using TCP. For reliable reception of notification, some management applications may want a sleep notification to be transmitted using TCP.

In this case, when the image forming apparatus 1 transmits a sleep notification to 192.168.1.1 using TCP in step S304 of FIG. 3, a TCP SYN packet is transmitted first. In response to SYN, when an SYN ACK packet is transmitted from 192.168.1.1 to the image forming apparatus 1, the receive filter controller 204 discards the SYN ACK packet, because the discard setting for the receive filter controller 204 is enabled in the configuration of the first embodiment. As a result, since a TCP session is not established, the sleep notification cannot be made to the destinations at 192.168.1.1 and 192.168.1.3 registered for sleep notification using TCP.

To solve this problem, in the second embodiment, if there is a destination registered for sleep notification using TCP, a stateful inspection function is enabled for the protocol stack 201 to perform receive-filter control processing. For example, when enabling the receive-packet discard setting in step S302 of FIG. 3, the sleep notification controller 206 determines whether there is any destination registered for sleep notification using TCP. If there is, the sleep notification controller 206 enables the stateful inspection function for the receive filter controller 204.

The stateful inspection function is the function of performing control to realize the following. For example, when the image forming apparatus 1 serves as a client and transmits request packet data, the transmitted packet data is stored as a log. On the basis of this log, the receive filter controller 204 determines whether received packet data is the corresponding response data. If the received packet data is the corresponding response data, the received packet data is subjected to receive-processing and is not treated as data to be receive-filtered.

By enabling the stateful inspection function, the sleep notification can be made to a destination registered for sleep notification using TCP. That is, according to the second embodiment, the sleep notification can be made even to a destination that performs communication using a protocol for delivery confirmation, such as TCP.

Third Embodiment

A third embodiment describes the case where the image forming apparatus to which the present invention is applied is shut down.

The shutdown of the image forming apparatus 1 has a problem similar to that in the transition to sleep mode.

Since filter control for discarding transmit and receive packets is effective during shutdown processing, it is necessary to transmit a shutdown notification before the filter control is enabled.

In this case, if there are many notification destinations and a print job or the like is received from an external host during the notification processing, the shutdown of the image forming apparatus is delayed. This results in a management mismatch.

In the present embodiment, again, a receive-filter control processing function only is first enabled for shutdown. After the receive-filter control processing function becomes effective, a shutdown notification is transmitted. Upon completion of the transmission of the shutdown notification, a transmit-filter control processing function is enabled. After the transmit-filter control processing function becomes effective, shutdown processing is started. The problem described above can be solved when the image forming apparatus software 2 has the capability of performing the series of control operations described above.

As described above, according to the present embodiment, it is possible to create a network environment where transmission of invalid network packets from a network device, such as an image forming apparatus, can be prevented and a management application that manages the device can accurately manage the state of the device without any mismatch.

In the foregoing embodiments, the device of the present invention has been described using the image forming apparatus as an example. However, the device of the present invention is not limited to the image forming apparatus. The device may be any device that is capable of communicating via a network and of going into sleep mode.

The structure and content of various types of data are not limited to those described above, and may be variously modified depending on the application and intended use.

Although some embodiments have been described above, the present invention may be embodied, for example, as a system, an apparatus, a method, a program, or a storage medium. Specifically, the present invention may be applied to a system composed of a plurality of devices or to an apparatus composed of a single device.

According to the present invention, it is possible to provide a mechanism for preventing transmission of an invalid network packet from a device restored from sleep mode, and for allowing a management application that manages the device to accurately manage the state of the device without any mismatch.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
a receiving unit configured to receive a packet;
a detecting unit configured to detect that a shift condition for shifting the information processing apparatus from a first power mode to a second power mode of which power consumption is lower than the first power mode is satisfied;
a setting unit configured to enable a first discard setting for discarding a packet received by the receiving unit, in response to the detecting unit detecting that the shift condition is satisfied; and
a transmitting unit configured to transmit a predetermined notification to an external apparatus in response to enabling of the first discard setting by the setting unit,
wherein the information processing apparatus is shifted to the second power mode after the transmitting unit transmits the predetermined notification to the external apparatus.

2. The information processing apparatus according to claim 1, wherein the predetermined notification indicates that the information processing apparatus is shifted to the second power mode.

3. The information processing apparatus according to claim 1, wherein the first discard setting is a setting for discarding all packets received by the receiving unit.

4. The information processing apparatus according to claim 1, wherein the setting unit disables the first discard setting in a case where the information processing apparatus is shifted from the second power mode to the first power mode.

5. The information processing apparatus according to claim 1, wherein the setting unit enables a second discard setting for discarding a packet to be transmitted by the information processing apparatus, in response to transmitting of the predetermined notification by the transmitting unit.

6. The information processing apparatus according to claim 5, wherein the second discard setting is a setting for discarding all packets to be transmitted by the information processing apparatus.

7. The information processing apparatus according to claim 5, wherein the information processing apparatus is shifted to the second power mode in response to enabling of the second discard setting by the setting unit.

8. The information processing apparatus according to claim 5, wherein the setting unit disables the first discard setting and the second discard setting in a case where the information processing apparatus is shifted from the second power mode to the first power mode.

9. The information processing apparatus according to claim 1, further comprising a storage unit configured to store notification destination information indicating a notification destination of the predetermined notification,
wherein the transmitting unit transmits the predetermined notification to the notification destination indicated by the notification destination information.

10. An information processing apparatus comprising;
a storage unit configured to store a destination to which information indicating that the information processing apparatus is to be shut down is transmitted;
a determination unit configured to determine that the information processing apparatus it to be shut down;
a first setting unit configured to make, when the determination unit determines that the information processing apparatus it to be shut down, a first setting so as not to prevent the information processing apparatus from being shut down by receiving data from an external apparatus;
a transmitting unit configured to transmit, after the first setting unit makes the first setting, the information indicating that the information processing apparatus is to be shut down, to the destination stored in the storage unit;
a second setting unit configured to make, after the transmitting unit completes transmitting the information to the destination stored in the storage unit, a second setting so as not to transmit data to an external apparatus; and
a control unit configured to control, after the second setting unit makes the second setting, the information processing apparatus to be shut down.

11. A method for controlling an information processing apparatus, the method comprising:
  receiving a packet;
  detecting that a shift condition for shifting the information processing apparatus from a first power mode to a second power mode of which power consumption is lower than the first power mode is satisfied;
  enabling a first discard setting for discarding a packet received, in response to the detecting that the shift condition is satisfied;
  transmitting a predetermined notification to an external apparatus in response to enabling of the first discard setting by the setting unit,
  wherein the information processing apparatus is shifted to the second power mode after the predetermined notification is transmitted to the external apparatus.

12. A non-transitory computer readable medium, having instructions that, when executed by a processor, cause the processor to execute operations for controlling an information processing apparatus, the operations comprising:
  receiving a packet;
  detecting that a shift condition for shifting the information processing apparatus from a first power mode to a second power mode of which power consumption is lower than the first power mode is satisfied;
  enabling a first discard setting for discarding a packet received, in response to the detecting that the shift condition is satisfied;
  transmitting a predetermined notification to an external apparatus in response to enabling of the first discard setting by the setting unit,
  wherein the information processing apparatus is shifted to the second power mode after the predetermined notification is transmitted to the external apparatus.

* * * * *